2,992,938
METHOD OF PREPARING NEAR-INFRARED SPECTRUM FILTER MEDIA

William J. McCarville and Bernard S. Wildi, Dayton, Ohio, assignors to Monsanto Chemical Company, St. Louis, Mo., a corporation of Delaware
No Drawing. Filed May 15, 1958, Ser. No. 735,379
13 Claims. (Cl. 117—16)

This invention relates to a novel means of preparing light filter media which are useful for screening out infra-red radiation. More particularly this invention relates to the process of dusting finely divided infra-red barrier compositions onto the surface of a transparent or translucent plastic material and burnishing the said compositions onto the surface of the said material.

Recent trends in design have provided increasingly large amounts of transparent and translucent materials in homes, commercial buildings, factories, automobiles, marine craft, and the like. It is recognized that these materials also transmit infra-red radiation. Accordingly, the increased exposure of the interior of architectural structures, vehicles, etc. to solar energy induces a relatively large temperature rise therein especially in the summer months and in the southern latitudes. Since the solar heat at sea level in mid-day is of the order of about 300 B.t.u. per hour per square foot, it is apparent that the increased exposure of the interior of objects to solar energy creates a problem in maintaining comfortable conditions in said interiors. This is in part obtained by the use of air-conditioning equipment. It is also possible to substantially reduce the penetration of infra-red radiation through the transparent or translucent material by the use of various infra-red filter media which reflect or absorb the infra-red radiation, whereby the load on the air-conditioning equipment can be materially reduced.

One class of organic compounds useful as infra-red filter media are the polymethine dyes disclosed in U.S. Patent No. 2,813,802, which patent is incorporated herein by reference. The said polymethine dyes can be described as bis(p-aminophenyl)vinylcarbonium compounds having the structural formula:

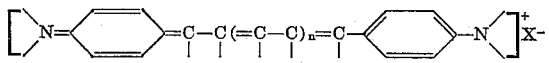

wherein $n$ is an integer up to 3, and $X^-$ is the anion of a strong acid. The polymethine dye compositions can be applied to transparent and translucent materials, generally in the form of sheets such as glass and various synthetic polymeric compositions, by treating with a solution of the dye as by spraying, flowing, pouring, brushing, etc. on the surface of the sheet. Also the dye can be applied as a fused liquid, or can be dusted onto the surface of the material as a comminuted solid and fused in place by the application of heat thereto. However these methods of application have inherent limitations which restrict the wide application of the polymethine dyes in infra-red filter media. Thus, many of the synthetic polymer compositions which may be desired as a supporting base for the dye film contain plasticizers, which are in part extracted during the solvent application of the dye solution, and may then deleteriously affect the dye film, etc. Also the solvents for the polymethine dyes tend to penetrate the synthetic polymer film base whereby it is very difficult to obtain reflective filtering of infra-red radiation. Applicatioin of the dye by fusion is limited to base materials which have relatively high melting points, since the melting point of the dyes are also relatively high, and in addition it is difficult to get a uniform coating of the dye applied to the base material when it is spread thereon as a comminuted solid and fused in place.

It is the principal object of the present invention to provide an improved method for the application of infra-red reflecting and absorbing compositions to base materials. Another object of the instant invention is to provide an improved method for the application of polymethine dyes to synthetic polymeric compositions. Other objects and advantages of this invention will be apparent to those skilled in the art from the following disclosure.

It has now been found that the infra-red reflecting and absorbing compositions can be applied to the base material as a finely comminuted solid and then burnished by the application of a buffing means to provide an improved infra-red filter media.

Films applied by the burnishing technique were found to be surprisingly resistant to smearing or rubbing off and were much superior to similar films which were coated on the base material from a solvent composition. The films applied by the burnishing techinique withstood repeated hard rubbing with the fingers with little change in appearance. If the fingers were oily or moist, the reflection of the film was dulled slightly. After the film was applied it was found that it could be rubbed with soft materials, e.g. cotton, and none of the infra-red reflecting and absorbing composition was transferred to the cotton and the film was unaffected.

It will be understood that the infra-red barrier film applied by the burnishing technique also can be protected from abrasion by laminating a protective transparent or translucent material over said film, e.g. glass or various light-transmitting polymeric compositions, or the infra-red barrier film can be protected by directly coating same with an abrasion-resistant polymeric composition.

For the best results the surface of the polymeric base material should be clean, i.e. free from oil, and when the polymeric base material is relatively thin it should be supported on a smooth, firm backing to avoid possible transfer of impressions of the backing to the infra-red reflecting and absorbing film. For the intermittent production of infra-red filter media by the burnishing technique a backing of clean, smooth, polished plate-glass or metal platen furnishes a suitable support, and for the continuous production of said film to a flexible polymeric base material the film preferably can be applied by burnishing a uniform application of the finely comminuted, solid, infra-red barrier composition as it passes over one or more smooth rolls, e.g. a highly polished metal roll. It is also possible to effect initial burnishing of the infra-red barrier film onto the supporting plastic material and thereafter redust the surface and again burnish one or more times when a heavier barrier film is desired.

The particle size of the infra-red reflecting and absorbing composition preferably should be as fine as possible such that 100 percent thereof could pass a 400-mesh screen. Preferably the particle size of the solid material should be at least of the order of about 2 to about 5 microns or finer in order to provide a substantially uniform appearing film.

The buffing means for burnishing the film can be any material which is not abrasive to the polymeric base support for the film. Suitable buffing materials are for example, cotton; wool; felt; fine-furred animal pelts, e.g. rabbit and the like; soft pile fabrics prepared from synthetic polymers, e.g. nylon and the like; soft pads of synthetic polymers, e.g. polyethylene; soft, pliant leather, e.g. chamois and the like; etc. Only a light buffing pressure need be applied, preferably not exceeding about 25 pounds per square inch. The lineal speed of the buffing means preferably should not exceed about 50 feet per second, and more preferably should be of the order of about 2 to about 10 feet per second. The burnishing time will vary somewhat depending on the pressure and lineal speed of the buffing means, but is of the order of a fraction of a second for mechanical burnishing up to about 5 seconds for hand burnishing, or longer.

The application of an infra-red reflecting and absorbing composition by the burnishing technique is suitable for use on many polymer materials and is most suitable for the generally harder surface polymeric compositions, for example cellulose-based materials such as cellulose acetate; polyvinyl acetals such as polyvinyl butyral; polyvinyl aromatics such as polystyrene; polyvinyl chloride; and the like.

The polymethine dye compositions of U.S. Patent No. 2,813,802 are particularly suitable for application as films by the burnishing technique. For best results it has been found that the dye compositions sought to be coated on the plastic base material should be substantially pure. Other classes of infra-red barrier materials which have also been found to be suitable are, for example, the porphyrines such as copper phthalocyanine, zinc tetraphenylporphine, zinc tetrabenzoporphine, tetrabenzomonoazoporphine, tetraphenylporphine, octaphenylporphyrazine, $\alpha,\beta,\gamma,\delta$-tetrakis(2-furyl)porphine, $\alpha,\beta,\gamma,\delta$-tetrakis(4-methoxyphenyl)porphine, etc.; and other types of materials as exemplified hereinafter; and the like. The burnishing technique has also been found to be suitable for the application of inorganic infra-red reflecting and absorbing materials as exemplified hereinafter.

The infra-red reflecting and absorbing material is generally applied in an amount such that about one pound of the material is employed to provide a film on the order of from about 15,000 to about 20,000 square feet of the polymeric base composition.

The instant invention is exemplified by the following illustrative examples:

Example 1

Finely powdered 1,1,7,7-tetrakis(p-dimethylaminophenyl)trivinylcarbonium perchlorate was dusted onto the surface of a 10 mil sheet of biaxial oriented polystyrene and buffed thereon with a pad of fine absorbent cotton to provide a film suitable for use as an infra-red filter media. The dye film was then protected from abrasion by coating with a polymethyl methacrylate lacquer comprising about 12.5 parts by weight of polymethyl methacrylate, 44.5 parts by weight of perchlorethylene and 43.0 parts by weight of aliphatic petroleum naphtha. After exposing to solar radiation for a period of 100 days the appearance, and infra-red reflection and absorption were still excellent.

Example 2

An infra-red filter was prepared in the same manner as Example 1, except that a 10 mil sheet of cellulose acetate was employed in place of the polystyrene. The heptamethine perchlorate film on the cellulose acetate base had excellent reflectivity. The film appeared reddish-purple by reflected light and blue by transmitted light. The filter was then exposed to solar radiation for 150 days, after which time the appearance and infra-red reflection and absorption of the filter were still very good. It was also found that the visible transmittance varied less than two percent after this exposure time.

Example 3

A solution of the dye of Example 1 in ethylene dichloride was coated onto a sheet of cellulose acetate plasticized with diethyl phthalate. After one year's solar exposure behind glass the gain in transmission was found to be about 60 percent. When the same dye was applied to the same material by mechanically burnishing on the dye film, it was found that the gain in transmission after one year's solar exposure was only about 3 percent.

Example 4

Finely divided rhenium oxide was dusted onto a film of polyvinyl butyral supported on a smooth rigid surface. Then a buffing pad of polyethylene film was employed to burnish the rhenium oxide onto the polyvinyl butyral to provide a reflecting film which adhered well to the plastic supporting base and was an effective infra-red filter.

Numerous other finely divided infra-red barrier compounds were buffed onto sheets of cellulose acetate to demonstrate the wide utility of the burnishing technique for the preparation of infra-red filters. The examples listed in the following table were prepared by dusting the specific compound onto the surface of a clean sheet of cellulose acetate and hand-buffing for a few seconds with a pad of fine absorbent cotton.

| Example | Compound | Color by transmission | Color by reflection | Quality of reflectance |
|---|---|---|---|---|
| 5 | 1,1,5,5-tetrakis(p-dimethylaminophenyl)divinylcarbonium phosphate. | Blue | Copper | Excellent. |
| 6 | 1,1,5,5-tetrakis(p-dimethylaminophenyl)divinylcarbonium phthalocyanine sulfonate. | do | do | Do. |
| 7 | 1,1,3-tris(p-dimethylaminophenyl)vinylcarbonium perchlorate | do | Gold | Do. |
| 8 | 1,3-bis 2(4,6-diphenylthiopyrylium)vinylcarbonium perchlorate | Green | Blue | Very good. |
| 9 | Copper phthalocyanine | Blue | Purple-red | Excellent. |
| 10 | Zinc tetrabenzoporphine | Yellow-green | Blue | Very good. |
| 11 | Zinc tetraphenylporphine | Yellow | Purple | Excellent. |
| 12 | Tetraphenylporphine | Salmon | do | Do. |
| 13 | Tetrabenzoporphine | Yellow | Blue | Good. |
| 14 | Tetrabenzomonoazoporphine | Green | do | Very good. |
| 15 | Copper tetrabenzomonoazoporphine | do | do | Excellent. |
| 16 | Tetrabenzodiazoporphine | do | Red | Do. |
| 17 | Copper tetrabenzotriazoporphine | Blue | do | Do. |
| 18 | $\alpha,\beta,\gamma,\delta$-Tetrakis(4-methyl)-porphine | Orange | Blue-purple | Very good. |
| 19 | $\alpha,\beta,\gamma,\delta$-Tetrakis($\alpha$-thienyl)-porphine | Yellow | Purple | Do. |
| 20 | $\alpha,\beta,\gamma,\delta$-Tetrakis(4-hydroxyphenyl)porphine | do | do | Do. |
| 21 | $\alpha,\beta,\gamma,\delta$-Tetrakis(4-methoxyphenyl)porphine | do | do | Excellent. |
| 22 | $\alpha,\beta,\gamma,\delta$-Tetrakis(2,4-dichlorophenyl)porphine | do | do | Good. |
| 23 | $\alpha,\beta,\gamma,\delta$-Tetrakis(1-naphthyl)-porphine | do | do | Very good. |
| 24 | Zinc $\alpha,\beta,\gamma,\delta$-tetrakis(4-pyridyl)porphine | do | do | Do. |
| 25 | Tetrahydroporphyrine | do | Blue | Excellent. |
| 26 | Octaphenylporphyrazine | Green | do | Very good. |
| 27 | Copper 2-phenacylpyridine | Yellow | Gold | Good. |
| 28 | Dithizone | Green | Purple | Do. |
| 29 | 6,14-dinaphthanaphtho-[1,8a,8,2a,b,c,1′,8a′,8′,7′-j,k,l]coronene | Blue | Red-purple | Excellent. |
| 30 | Rhodamine B | Purple | Gold | Do. |
| 31 | Hemin | Red-brown | Purple | Good. |
| 32 | Cyanine green | Green | Copper | Excellent. |
| 33 | Bromocresol purple | Yellow | Gold | Good. |
| 34 | Quinalizarin | Pink | do | Do. |
| 35 | Chloranil-hydroquinone | Salmon | do | Do. |
| 36 | Chlorantine 4GL | Blue | Purple | Excellent. |
| 37 | Luxol fast blue | Purple | do | Good. |

For glazing materials the infra-red filter ideally should transmit the visible light with little reflection or absorption and should effect a relatively large reduction in the transmission of infra-red radiation, principally by reflection. In practice the infra-red barrier film also functions by absorption, but it will be apparent that the reflective film is more efficient. Accordingly, the burnishing technique is a very useful improvement in that it provides a means of obtaining films having a high order of reflection in contradistinction to many films prepared by solvent application.

The infra-red filter media prepared by the burnishing technique are useful as commercial heat screens and find particular use in architectural applications such as industrial, commercial, and residential glazing. These infra-red filter media are also useful for automotive, marine craft and aircraft glazing; for sun glasses, welder's goggles, and the like.

We claim:

1. A method of preparing an infra-red filter media comprising dusting a coating of a finely divided minus 400-mesh, solid, infra-red barrier composition, selected from the group consisting of organic dyes, organometallic dyes, and rhenium oxide, onto the surface of a visible light transmitting plastic material and burnishing the infra-red barrier composition onto the surface of said material and the final filter product transmits visible light.

2. The method of claim 1, wherein the lineal speed of the buffer does not exceed about 50 feet per second, and the buffing pressure does not exceed about 25 pounds per square inch.

3. The method of claim 2, wherein the particle size does not exceed of the order of about 5 microns and the lineal speed of the buffer is from about 2 to about 10 feet per second.

4. The method of claim 1, wherein the infra-red barrier composition is a bis(p-aminophenyl)vinylcarbonium compound of the class

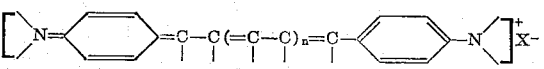

wherein $n$ is an integer from 0 to 3, inclusive, and $X^-$ is the anion of a strong acid.

5. The method of claim 4, wherein the infra-red barrier composition is 1,1,7,7-tetrakis(p-dimethylaminophenyl)trivinylcarbonium perchlorate.

6. The method of claim 4, wherein the infra-red barrier composition is 1,1,5,5-tetrakis(p-dimethylaminophenyl)divinylcarbonium perchlorate.

7. The method of claim 4, wherein the infra-red barrier composition is 1,7-bis[4-(N,N-dimethylamino)-phenyl]-1,7-bis(phenyl)trivinylcarbonium perchlorate.

8. The method of claim 4, wherein the infra-red barrier composition is 1,5-bis[4-(N,N-dimethylamino)phenyl]-1,5-bis(phenyl)divinylcarbonium perchlorate.

9. The method of claim 4, wherein the infra-red barrier composition is 1,5-bis[4-(N,N-dimethylamino)phenyl]-1,5-bis(phenyl)divinylcarbonium p-toluenesulfonate.

10. The method of claim 4, wherein the plastic material is cellulose acetate.

11. The method of claim 4, wherein the plastic material is polystyrene.

12. The method of claim 4, wherein the plastic material is polyvinyl butyral.

13. The method of claim 4, wherein the plastic material is polyvinyl chloride.

References Cited in the file of this patent
UNITED STATES PATENTS

| | | |
|---|---|---|
| 2,281,100 | Land | Apr. 28, 1942 |
| 2,813,802 | Ingle et al. | Nov. 19, 1957 |
| 2,817,603 | Louis | Dec. 24, 1957 |